United States Patent
Borza

[19]

[11] Patent Number: 5,920,384
[45] Date of Patent: Jul. 6, 1999

[54] OPTICAL IMAGING DEVICE

[75] Inventor: Stephen J. Borza, Ottawa, Canada

[73] Assignee: Dew Engineering and Development Limited, Ottawa, Canada

[21] Appl. No.: 08/986,939

[22] Filed: Dec. 9, 1997

[51] Int. Cl.⁶ ........................ G06K 9/20
[52] U.S. Cl. ........................ 356/71; 382/126
[58] Field of Search ............ 356/71; 382/124, 382/126, 127

[56] References Cited

U.S. PATENT DOCUMENTS

| | | | |
|---|---|---|---|
| 4,322,163 | 3/1982 | Schiller | 356/71 |
| 4,544,267 | 10/1985 | Schiller | 356/71 |
| 4,553,837 | 11/1985 | Marcus | 356/71 |
| 5,289,253 | 2/1994 | Costello et al. | 356/71 |
| 5,448,649 | 9/1995 | Chen et al. | 356/71 |
| 5,548,394 | 8/1996 | Giles et al. | 356/71 |
| 5,625,448 | 4/1997 | Ranalli et al. | |
| 5,796,858 | 8/1998 | Zhou et al. | 356/71 |

Primary Examiner—Richard A. Rosenberger
Attorney, Agent, or Firm—Neil Teitelbaum & Associates

[57] ABSTRACT

An optical imaging device such as a fingerprint imager has a platen formed of a plurality of parallel prisms and a light source for illuminating a portion of the platen. An optical sensor is disposed so as to receive light from the light source reflected off a surface of the platen and directed toward the optical sensor. The platen is mounted moveable relative to the sensor so as to allow scanning of a fingertip in contact with the platen during relative motion of the platen and the sensor. Preferably, the platen is formed of a microprism structure.

17 Claims, 9 Drawing Sheets

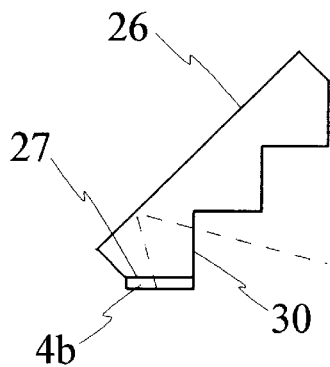 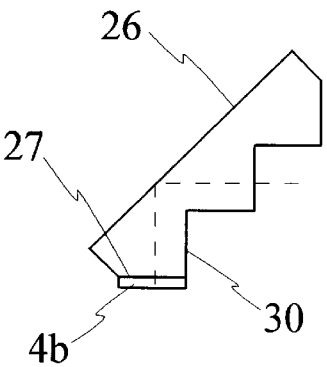
Fig. 5a          Fig. 5b
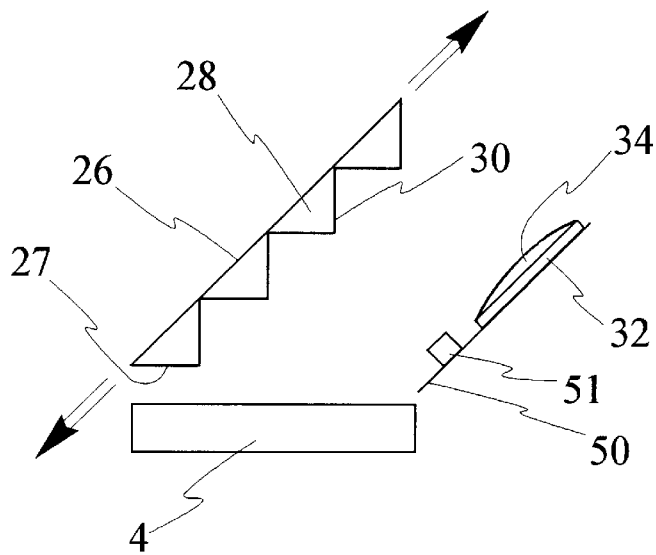
Fig. 6
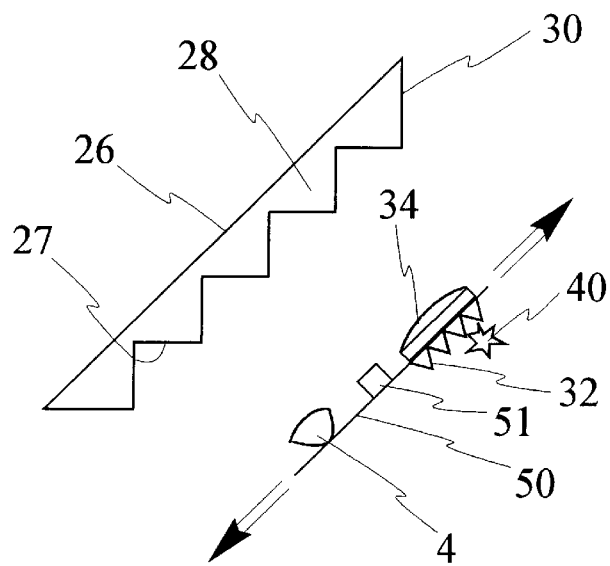
Fig. 7

OPTICAL IMAGING DEVICE

FIELD OF THE INVENTION

This invention relates generally to contact imaging devices and more particularly to an optical device for imaging fingerprints and the like.

BACKGROUND OF THE INVENTION

In a known fingerprint detection apparatus, the finger under investigation is usually pressed against a flat surface, such as a side of a prism or a glass plate, and the ridge and valley pattern of the finger tip is illuminated with an interrogating light beam. In the optical devices which employ prisms, the prism has a first surface upon which a finger is placed, a second fingerprint viewing surface disposed at an acute angle to the first surface, and a third illumination surface through which light is directed into the prism. The incident beam of light is reflected from the first surface and exits through the fingerprint viewing-surface. An image producing lens or lens system is provided for receiving the beam reflected from the valleys of the subject fingerprint and for producing an image of the subject fingerprint at an image sensor, e.g. a charge coupled device (CCD) or the like for coverting the fingerprint image into an electric signal. An amplifying/analysing signal processing circuit and a monitor for displaying the fingerprint image are also provided. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 4,924,085, 5,109,427 and 5,233,404.

Fingerprint identification devices of this nature are generally used to control building-access or information-access of individuals to buildings, rooms, and devices such as computer terminals.

One of the problems associated with fingerprint sensors concerns the reliable and accurate transformation of ridge and valley pattern of the fingertip into electrical or optical signals to be stored in a digital format. Optical systems as described above, for example using a prism, require sophisticated equipment and tend to be bulky and costly.

Using an optical contact imaging device, the height from platen to imaging circuit is a function of a trapezoid formed by the CCD at one base thereof and the lens at the other base thereof, assuming lenses of comparable focal power. A large base gives rise to a large trapezoid compared to the two trapezoids defined by two smaller bases and so forth. By increasing the number of imaging paths, the distance from platen to imaging circuit is reduced.

OBJECT OF THE INVENTION

Thus, in an attempt to overcome these and other limitations of known prior art devices, it is an object of this invention to provide a more compact and robust optical imaging device.

It is an object of the invention to provide a device that utilizes an optical imaging path and a platen relatively moveable to the optical imaging path. This provides a system allowing the platen to move relative to the optical imaging path to permit imaging of different portions of the platen or of an object in contact therewith.

It is a further object of the invention to provide an optical imaging device that is relatively inexpensive and practicable to manufacture.

SUMMARY OF THE INVENTION

In accordance with the invention, there is provided a biometric imaging device comprising:

an optical sensor for detecting incident light and for providing a second signal in dependence upon incidence light;

a light source for providing light to the optical sensor along an optical path;

a platen comprising a plurality of prisms, the platen disposed within the optical path for reflecting a portion of light incident thereon along the optical path toward the optical sensor;

wherein at least one of the optical path and the platen is moveable relative to the other to provide relative movement therebetween; and, a motion sensor for sensing relative motion between the platen and the optical path and for providing a first signal in dependence thereon.

In an embodiment, the optical sensor comprises a linear array of optical sensors for capturing a scan line; wherein the platen comprises a microprism structure; and comprising a processor for determining a location of a captured scan line and for performing one of providing the scan line with further data indicative of the location and storing the scan line at a memory address based on the location.

According to the invention, there is provided a biometric imaging device comprising:

i) a moveable platen having a first surface for accepting a biometric information source on one side thereof and a plurality of substantially parallel prisms having a face parallel to the first surface and illumination and viewing faces on a second side of the platen;

ii) a motion sensor for sensing movement of the moveable platen and for providing a first signal in dependence thereon;

iii) a source of light for directing light through an illumination face of a prism from the plurality of prisms and for illuminating a portion of the first surface; and, iv) an image sensor for receiving light reflected from the first surface through a viewing face of a prism from the plurality of prisms and for providing a second signal in dependence upon received light.

According to another aspect of the invention, there is provided a method of capturing biometric information. The method comprises the steps of:

a) providing a biometric information source;

b) capturing a scan line across the biometric information source with an image sensor;

c) measuring a scan line location using a motion sensor;

d) storing the captured scan line in memory;

e) moving the biometric information source relative to the image sensor;

f) detecting the relative motion;

g) capturing another scan line across the biometric information source with the image sensor;

h) storing the captured other scan line in memory in dependence upon the detected relative distance; and, i) repeating the steps (e), (f), (g), and (h) a plurality of times.

According to the invention, there is provided a fingerprint imaging device comprising:

a linear photodetector array for detecting incident light and for providing a second signal in dependence upon incident light;

a light source for providing light to the linear photodetector array along an optical path;

a microprism structure disposed with a substantially flat side thereof for receiving a fingertip and with a portion of the other side thereof within the optical path for receiving light from the light source and for reflecting a portion of light incident thereon along the optical path toward the optical photodetector array, the microprism structure moveably mounted to permit movement along a direction substantially parallel to the substantially flat side thereof;

a motion sensor for sensing relative motion between the platen and the optical path and for providing a first signal in dependence thereon; and, a processor for storing image information based on the first and second signals, whereby an entire image of a fingerprint is captured by detecting incident light at each of a plurality of different relative locations and by storing information relating to the detected incident light at each different location.

BRIEF DESCRIPTION OF THE DRAWINGS

Exemplary embodiments of the invention will now be described in conjunction with the following drawings, in which:

FIG. 5a is a simplified diagram of a device according to the invention indicating an optical path from a light source through a microprism platen;

FIG. 5b is a simplified diagram of the device shown in FIG. 5a indicating another optical path;

FIG. 6 is a simplified diagram of a device according to the invention comprising a stationary light source;

FIG. 7 is a simplified diagram of a device according to the invention comprising a moving optical path and a stationary platen;

DETAILED DESCRIPTION OF THE INVENTION

Figure 1:
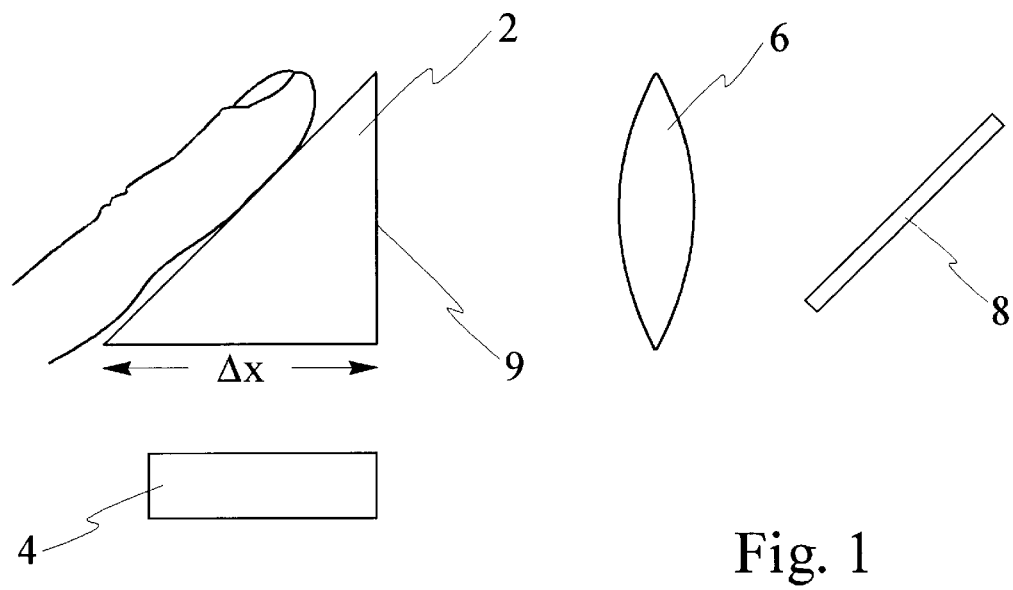
FIG. 1 is a simplified diagram of a prior art apparatus for identifying fingerprints.

A known optical fingerprint imaging device shown schematically in FIG. 1 has a prism 2 and a light source 4 for emitting a light beam onto a surface of the prism on which a finger is placed. A lens 6 is provided for receiving the reflected light beam from the subject fingerprint and for producing an image of the fingerprint on an image sensor 8, typically a charge coupled device (CCD) array. An amplifying circuit, not shown, is also part of the device.

The size of the prism is determined by the size of a typical human finger to be analyzed. Assuming a right angle prism and the angle between the finger-receiving surface and the viewing surface 9 being about 45 degrees, the minimum size of the illuminating surface $\Delta x$ is also determined. It is known that the distance between the prism and the lens 6 should be larger than the size $\Delta x$ of the illuminating surface. Since it is advantageous and desirable to reduce the overall size of the device, it follows that it is also desirable to reduce the size $\Delta x$.

Figure 2:
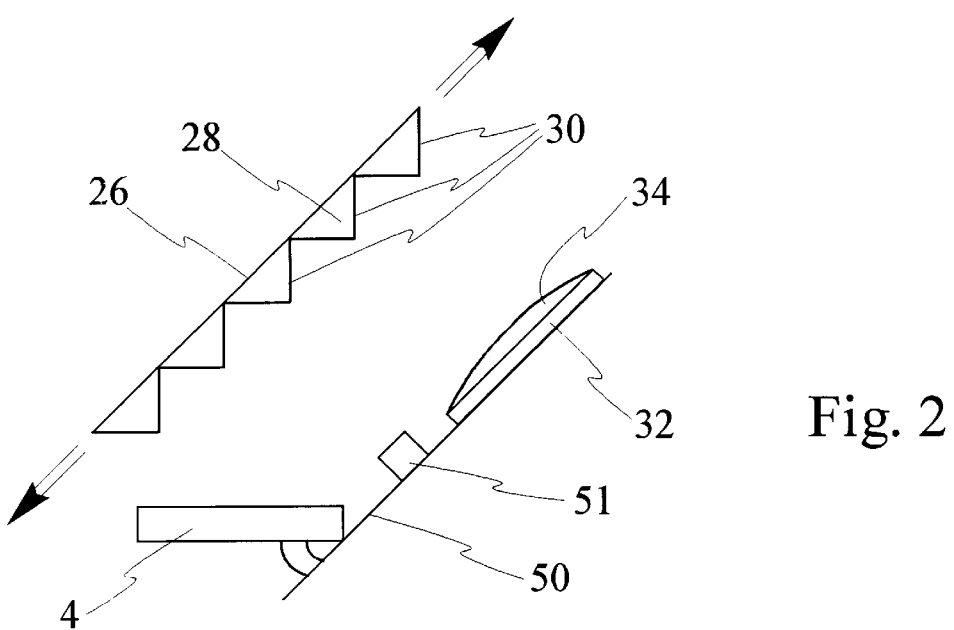
FIG. 2 is a simplified diagram of one embodiment of the device of the invention comprising a movable platen.

Referring to FIG. 2, a multi-prism 26 in the form of a microprism structure comprising a plurality of substantially parallel elongate prisms is shown. The staircase-shaped prism, shown in a side view, may be designed in a single piece as shown or as a plurality of small prisms 28 secured to a common backing. As seen in FIG. 2, each small prism 28 is illuminated with a portion of the light emitted by the source 4, and the light is reflected from an object, e.g. a fingertip as shown in FIG. 1, applied to the slanted face of the prism 26. The light source 4 is mounted on a circuit board 50. The reflected light passes through a viewing face of a prism 30 onto image sensor 32 in the form of a linear array of photodetectors or charge coupled devices (CCDs) having a lens 34 applied directly thereto to simplify the design and to minimize the size of the device. The path that is followed by the light from the light source 4 to the sensor 32 is referred to as the optical path throughout this specification and the claims. The image sensor 32 is also mounted on the circuit board 50. The analyzing circuit is not illustrated.

As the multi-prism 26 is moved across the circuit board, a motion sensor 51 in the form of an optical sensor detects motion of the multi-prism 26. The sensed distance of motion is used to assist in image reconstruction. Of course, an electrical motion sensor, a mechanical motion sensor, or another motion sensor may be used in place of the optical motion sensor.

Figure 3:
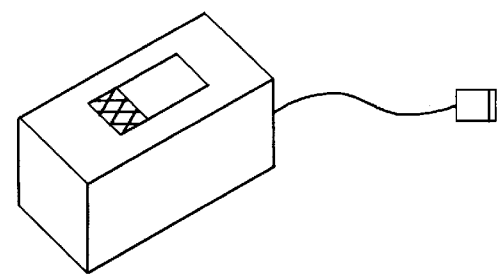
FIG. 3 is a simplified diagram of a device according to the invention for connection to a parallel port of a personal computer.
Figure 4:
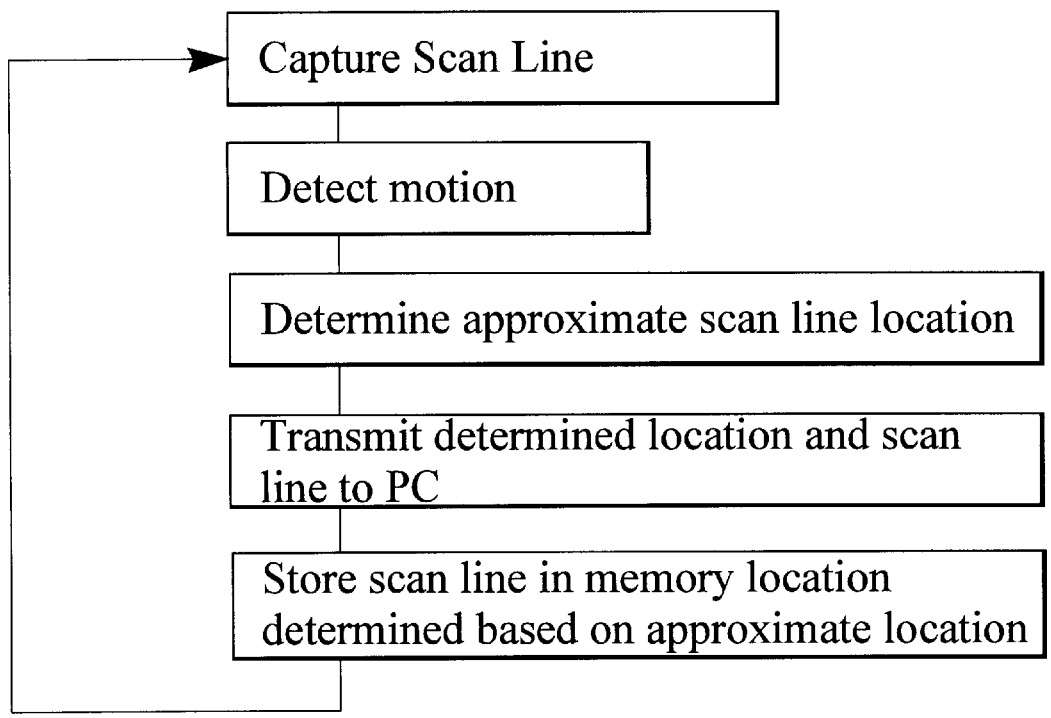
FIG. 4 is a simplified flow diagram of a method according to the invention.

Referring to FIG. 3, a fingerprint imager according to the invention and for coupling with a personal computer parallel port is shown. The speed of a parallel port is known to be significantly slower than image capture speeds for high-resolution images. There are disadvantages to employing sufficient buffer memory within the fingerprint imager such as increased cost, complexity and so forth. Therefore, according to an embodiment of the invention shown in flow diagram in FIG. 4, a scan line is captured across the micro-prism 26 and parallel with a small prism 28. The scan line forms a portion of an image less than the whole typically comprising one row or column of pixels. Of course, a plurality of scan lines may be captured simultaneously in some applications where more than one linear array of CCDs is present. The motion sensor 51 senses a location of the platen 26 relative to the image sensor 32 and an estimate of the scan line location within an image being captured is determined. The estimated location is provided to the personal computer along with the scan line information. When the personal computer receives the scan line of information, it stores the information in a memory location determined in dependence upon the determined scan line location within an image. Once the scan line is completely transferred, another scan line is captured and a location for that scan line is determined. As such, relative motion between the microprism 26 and the image sensor 32 at random speeds and accelerations have little effect on imaging. This allows the motion to be driven by a user providing the biometric information thereby reducing costs over a mechanically driven moveable micro-prism 26 or moveable sensor. Of course, where desired, a mechanically driven micro-prism or a mechanically driven sensor is employed. Since a motion sensor is used, the mechanically driven motion requires little accuracy.

Preferably, a processor within the fingerprint imager maintains information relating to locations of captured scan lines within the image being captured. This facilitates filtering of scan lines to prevent duplication of scan lines provided to the personal computer. Alternatively, scan lines provided in duplicate are used to verify data previously received by the personal computer. In a further preferred embodiment, the image sensor is controlled by a controller forming part of the microprocessor or actuated thereby. The controller is responsive to the signal from the motion sensor and actuates image capture of a scan line when the signal from the motion sensor is indicative of a scan line location within the image being captured that is not yet imaged and stored.

Alternatively, each scan line is stored as it is received and then, image reconstruction is performed once the image data is sufficiently complete. Further alternatively, image analysis is performed on the image data as stored using the information relating to the scan line location for indexing purposes. Of course, other methods of performing image analysis and reconstruction are known in the art.

Figure 5:
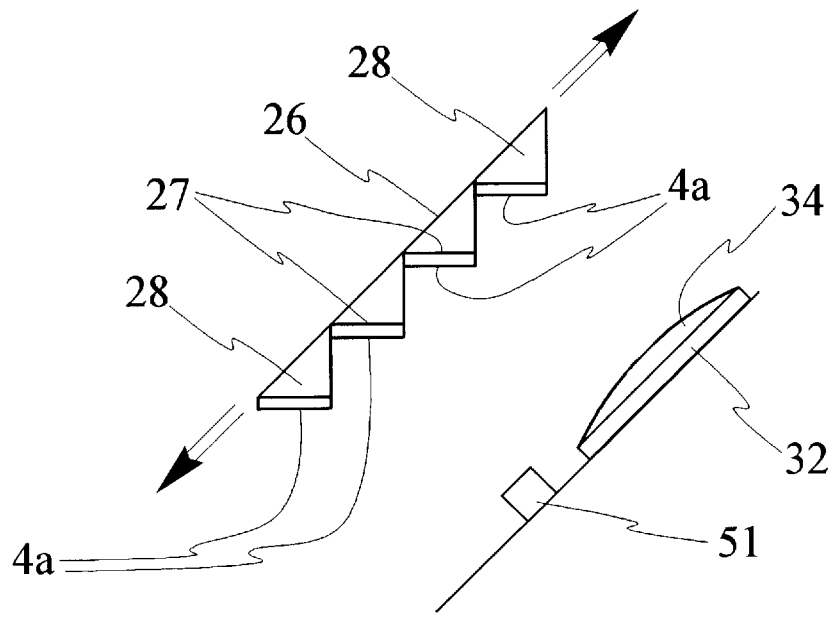
FIG. 5 is a simplified diagram of a device according to the invention comprising a plurality of light sources.

A somewhat different embodiment is illustrated in FIG. 5, the difference being that the single source of light 4 is replaced by separate light sources 4a applied directly to the illuminating surfaces 27 (shown on the bottom side) of the small prisms 28. The light sources 4a are stationary relative to the platen 26 and relative motion is actuated between the optical sensor 32 and the platen 26. In FIG. 5a an embodiment where light is reflected through an illuminating surface 27 and a viewing surface 30 of a same prism is shown. As shown in FIG. 5b, this need not be so. By making the platen thicker or applying a coating thereto, light from the light source 4b is directed through an illuminating surface 27 of a first prism, reflected off the platen 26 and through a viewing surface 30 of a second other prism.

A variation of the embodiment shown in FIG. 5 is shown in FIG. 6 and comprises a single light source for illuminating the entire platen. The light source may be moveable relative to the platen or relative to the sensor or both. In the embodiment, the light source illuminates a portion of the platen from which reflected light is sensed by the sensor. As shown in FIG. 6, a conventional light source 4 for use in optical fingerprint imaging is used and illuminates a large area of the platen 26. The light source 4 is fixed relative to a housing of the imaging device as is the image sensor 32; the platen 26 is moveably mounted within the housing to support relative motion between the platen 26 and the image sensor 32.

Referring to FIG. 7, an imaging device is shown wherein the sensor 32 is mounted on the circuit board 50, which is disposed on rails for allowing motion in a substantially transverse direction. The sensor is driven by a mechanical drive 40 in the form of a gear driving a mating toothed edge of the circuit board 50. The mechanical drive 40 causes the sensor 32 to capture each of a plurality of scan lines sequentially. Each scan line is of different portions of the platen 26. Mechanical driven are well known in the art. In such an embodiment, it is advantageous that the platen 26 is fixed. Optionally, the light source 4 is fixed relative to the platen 26. Further optionally, the light source 4 is fixed relative to the sensor 32 (as shown).

Figure 8:
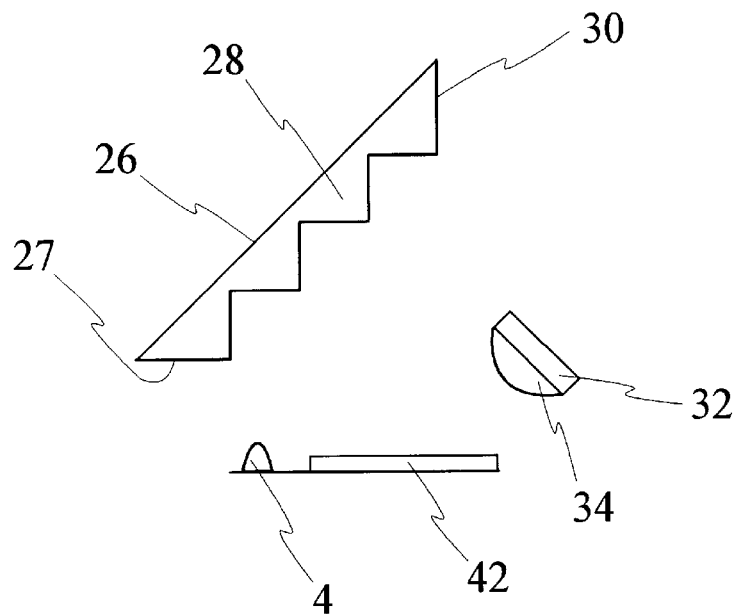
FIG. 8 is a simplified diagram of a device according to the invention comprising a mirror disposed within the optical path.
Figure 8A:
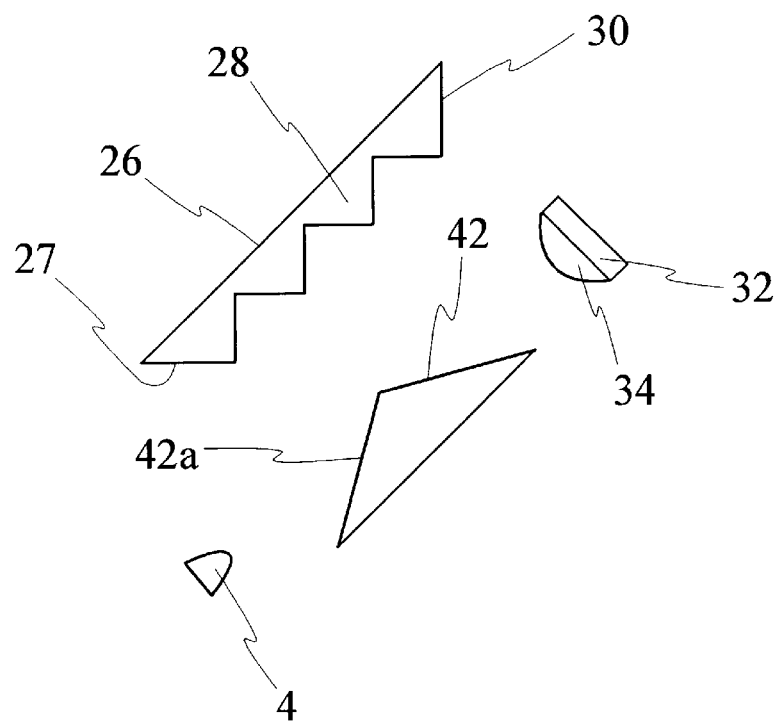
FIG. 8a is a simplified diagram of a device according to the invention comprising a plurality of mirrors disposed within the optical path.

Referring to FIG. 8, an imaging device according to the invention is shown, wherein the optical path is varied by moving a mirror 42. Such an embodiment reduces the number of moving electronic components and therefore acts to reduce wiring and wiring related maintenance. In a further embodiment shown in FIG. 8a, the light source 4 is stationary. A mirror 42a reflects light from the light source toward an illumination surface 27 of a prism 28 forming part of the platen 26. The light is reflected along the optical path off the platen 26 through a viewing surface 30 reflecting off mirror 42 to the optical sensor 32. The optical sensor 32 has a lens 34 disposed thereon. Optionally, a separate lens is disposed proximate the sensor 32 instead of on the optical sensor 32.

Figure 9A:
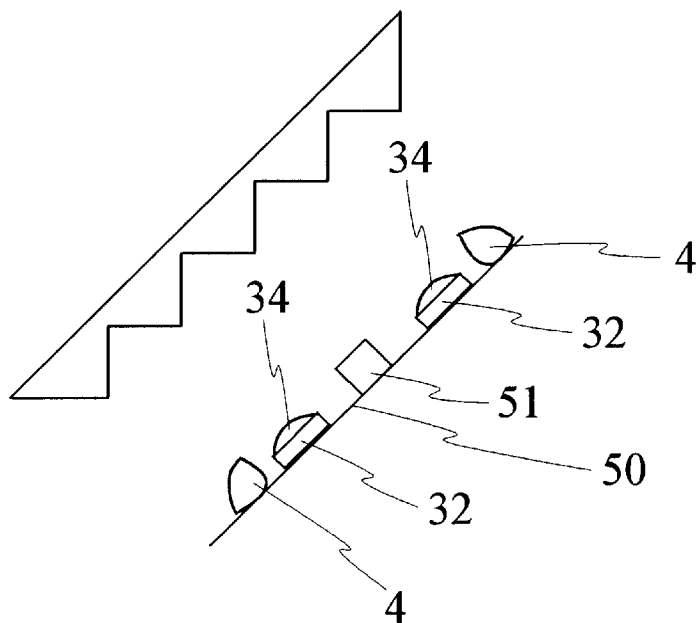
FIGS. 9a and 9b are simplified diagrams of a device according to the invention comprising a plurality of optical paths.
Figure 9B:
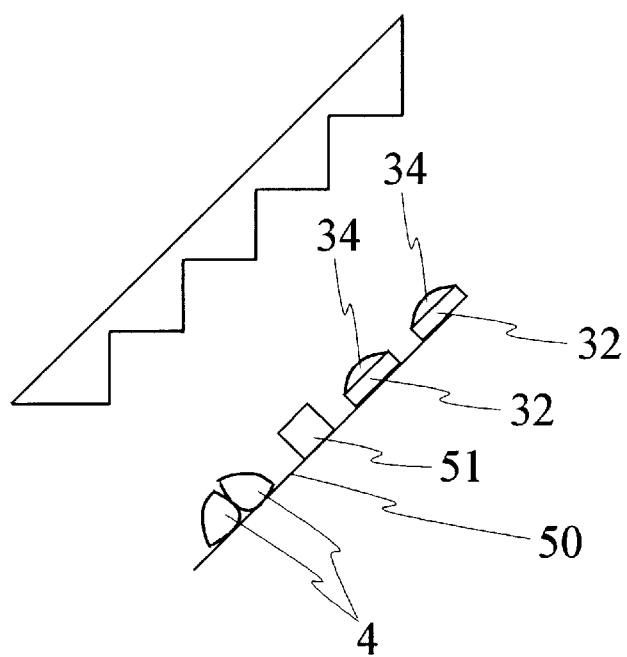

Referring to FIGS. 9a and 9b, an imaging device according to the invention is shown wherein a number of sensors 32 are disposed below the platen 26. Such an embodiment is advantageous because an entire image of, for example, a fingerprint is captured in a fraction of the time. Unfortunately, when an imaging device is coupled to a slow data transfer port, the device requires random access memory (RAM) for storing the data. Optionally, the RAM is not used and the multiple sensors are for providing enhanced flexibility or an upgrade option. In the embodiment shown in FIG. 9a, the illuminating surface 27 of each prism 28 is used as an illuminating surface for a first optical sensor and as a viewing surface for a second other optical sensor.

Alternatively, a light source 4 and an optical sensor 32 are disposed so as to scan an area of the platen 26 not scanned by other sensors 32. In an embodiment, when 4 prisms 28 form the platen 26 as shown in FIG. 9a, four light sources 4 and four image sensors 32 are disposed below the platen 26. This reduces the required relative motion between the sensors 32 and the platen 26 to the width of a single prism 28 at an edge adjacent the platen 26. Of course, the light sources may be applied to the illuminating surfaces as shown in FIG. 5 or, alternatively, a single fixed light source is employed to illuminate sufficient portions of the platen 26 for imaging.

According to an embodiment, the imaging device supports image capture at a plurality of different resolutions along a single axis. For example, when 50 scan lines are desired, a microprocessor within the control circuitry transmits to the host computer for storage 50 separate scan lines captured by the sensor 32. Preferably, these scan lines are substantially equidistant and cover sufficient platen area to provide an image of the biometric information. Alternatively when 100 separate scan lines are desired, a same area is divided into 100 scan lines. As is evident to those of skill in the art, dynamic allocation of scanning resolution is possible and facilitates imaging of fingerprints of different sizes with a same contact-imaging device. Alternatively, the 100 scan lines form an image of a different area of the platen 26 determined based on a presence or absence of information on portions of the platen 26. Further alternatively, the 100 scan lines form an image of substantially the entire area from which reflected light reaches the sensor 32.

Figure 10:
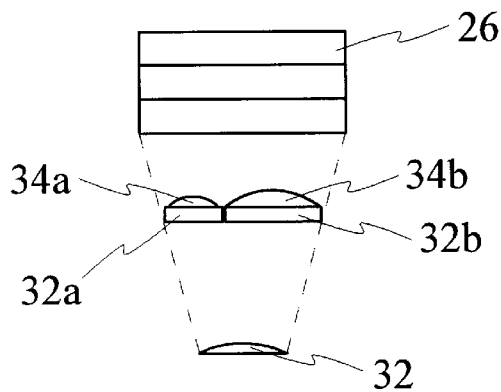
FIG. 10 is a simplified diagram of a device according to the invention supporting multiple resolutions.

In an embodiment shown in FIG. 10, an imaging device provided with a plurality of different resolutions along two axes is shown. The optical sensor 32 is disposed in one of 3 locations. A first location is for capturing a lower resolution image and is farther from the platen 26. A second location is for capturing a higher resolution image of only half the surface area of the platen 26. The third location is analogous to the second location but for the other half of the platen 26. When lower resolution images are sufficient, the sensor 32 is maintained in the first location and captures a single scan line substantially across the width of the platen 26. A plurality of scan lines are then assembled to form an image of biometric information presented upon the platen. When a higher resolution image is desired, the sensor is moved to the second location (shown at 32a) and captures a plurality of scan lines substantially across half the width of the platen 26 but having a same number of pixels and therefor greater resolution. Once half the image is captured and stored, the sensor is moved to the third location (shown at 32b) for capturing an image of another half of the platen 26. Optionally, when a mirror is used to modify the optical path, the sensor 32 remains stationary. Two embodiments of mirrored optical pathed image sensors with multiple resolutions are shown in FIGS. 10a and 10b.

Figure 10A:
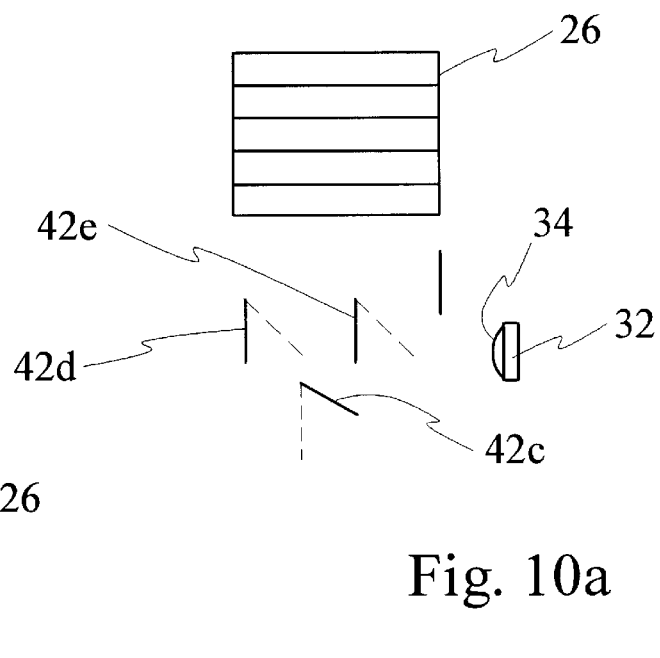
FIG. 10a is a simplified diagram of a device according to the invention supporting multiple resolutions.

Referring to FIG. 10a, an imaging device comprising three mirrors 42c, 42d, and 42e is shown wherein each mirror is actuated to direct portions of light reflected from the platen 26 toward the optical sensor 32. Each mirror is provided with means of moving said mirror so as to direct light reflected from the platen 26 toward said mirror surface and from said mirror surface reflect the light toward the optical sensor 32. The light reaching the sensor 32 is either from an entire scan line across the platen 26 when mirror 42c is actuated or from a scan line across half the width of the platen 26. Of course, scan lines of ⅓, ¼, ⅕ etc. of the platen 26 are possible using additional mirrors.

Figure 10B:
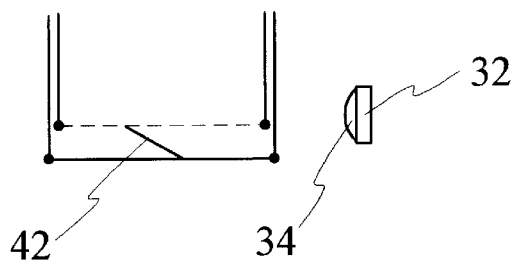
FIG. 10b is a simplified diagram of a device according to the invention supporting multiple resolutions.

Referring to FIG. 10b, another embodiment using a single mirror 42 moveably mounted to allow for positioning of the mirror 42 to provide any of a plurality of optical paths for enhancing image resolution is shown. Here, image resolution may also be increased by fractional amounts when two mirror positions form optical paths, which overlap one another at the platen surface. For example, when images are captured of a right portion of the platen and of the light portion of the platen, and the images overlap by 50%, then the resolution is increased to 3⁄2 that of an image captured using a single scan line across the platen surface.

In another embodiment, the sensor is operable in a wide angle mode and in a narrower image capture mode. A method of accomplishing this is employing two optical sensor arrays each with a different mode of operation. Since the optical sensor arrays are small linear inexpensive components, the use of two such components is not prohibitively expensive. As such, by receiving image data from a first optical sensor, a lower resolution image is captured and by receiving image data from the second optical sensor, a higher resolution image is captured. In yet another embodiment, a single linear optical sensor array is used, providing either of two signals. A first signal is from half the array being every second sensor element. A second signal is from the entire array. Alternatively, the second signal is from the second half of the array. Of course other fractions than ½ may be used according to the invention and ½ is merely recited for exemplary purposes. Also, by providing two optical sensor arrays offset from one another so as to allow a single photodetector to scan locations on the platen that are not scanned by other photodetectors by, for example, interleaving the photodetectors, a higher resolution imaging device is produced using two linear optical sensor arrays.

Figure 11:
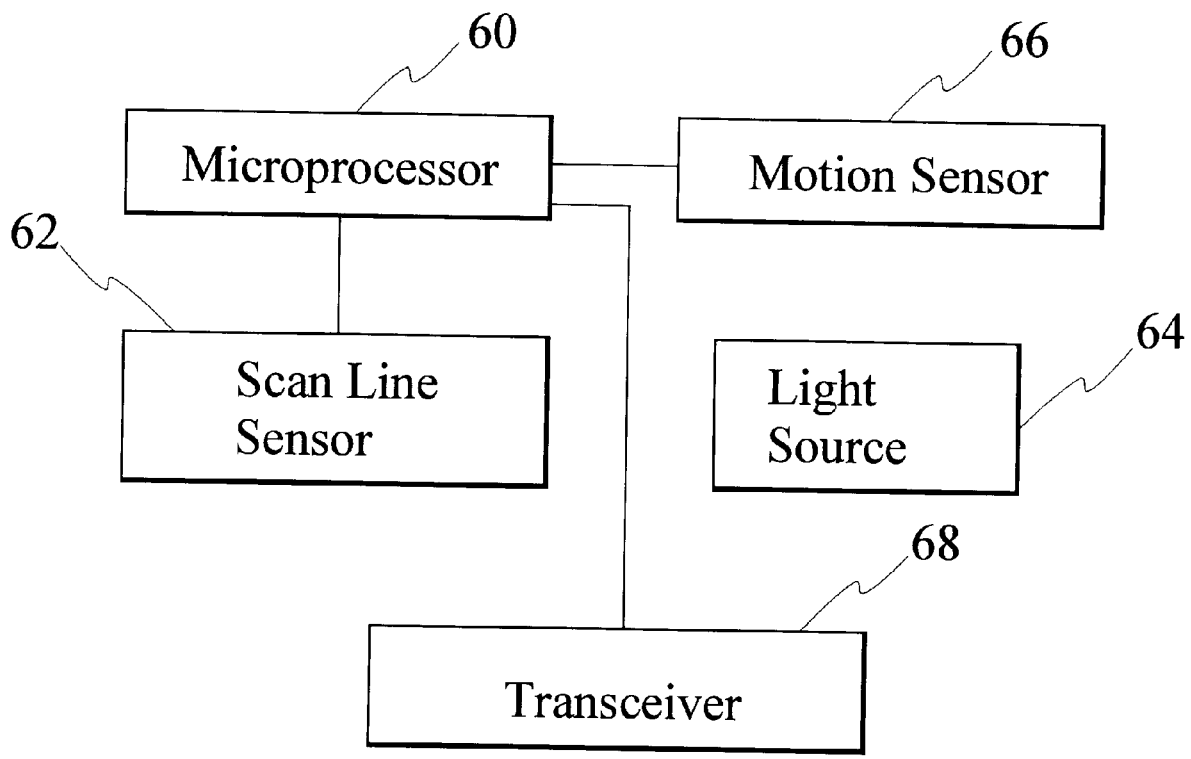
FIG. 11 is a simplified block diagram of a device according to the invention.

Referring to FIG. 11, a simplified block diagram of the analysis and communication circuitry is presented. A microprocessor 60 comprises means for receiving scan line data, means for determining scan line locations, means for preparing scan line and scan line location data for transmission, and means for analysing scan line data for a presence of desired data. Optionally, the analysis circuit comprises means for detecting predetermined patterns within the scan line data. The circuit also comprises a scan line sensor 62 in the form of a linear array of charge coupled devices, a light source 64 in the form of an LED, a motion sensor 66 in the form of an optical motion sensor and a transceiving circuit 68 for communication with a personal computer.

Figure 12:
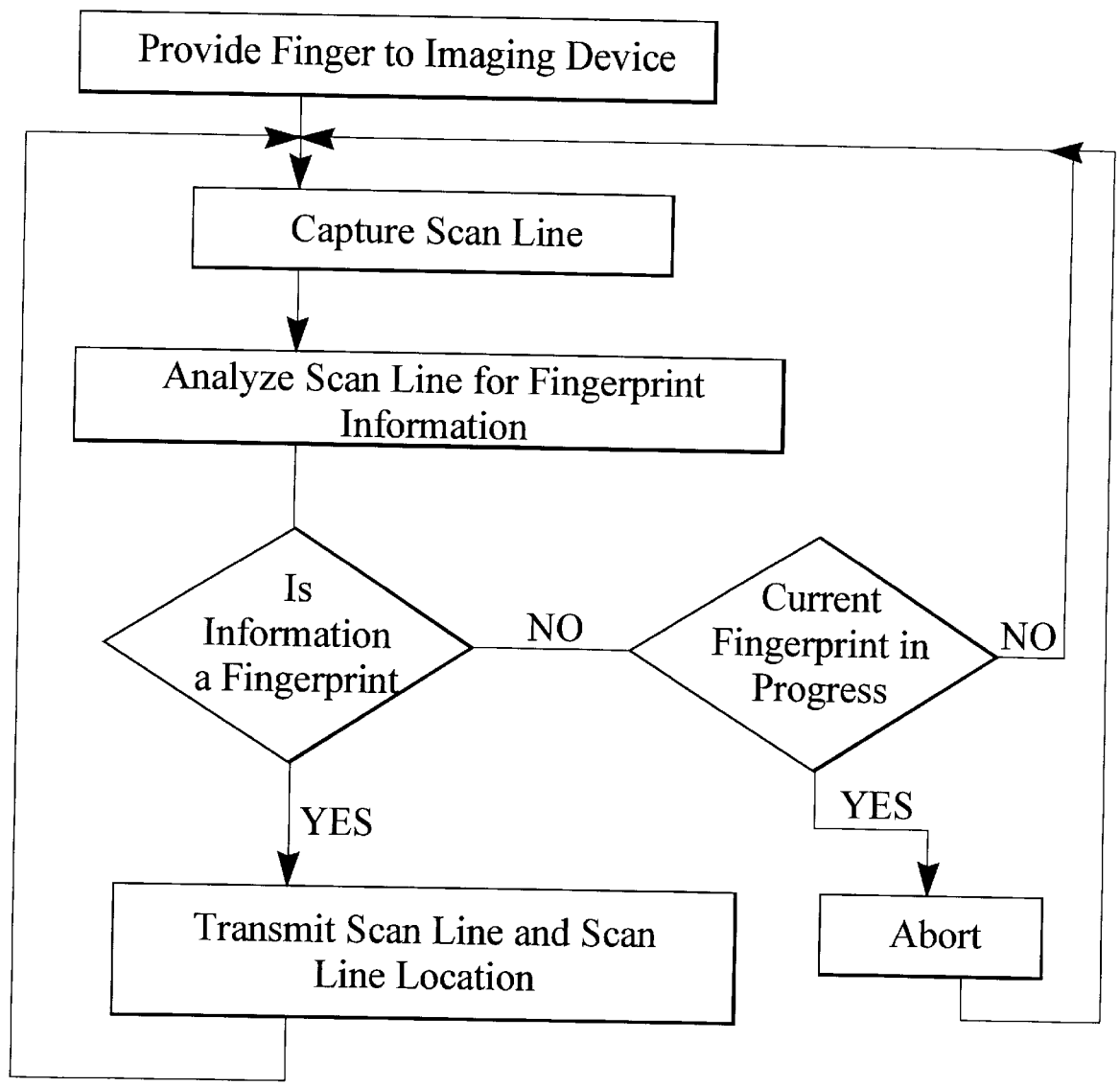
FIG. 12 is a simplified flow diagram of a method of capturing biometric images according to the invention; and, FIG. 13 is a simplified flow diagram of a method of constructing an image from captured scan line information according to the invention.

Referring to FIG. 12, a flow diagram of a method of capturing images according to the invention is shown. A finger is provided to an imaging device according to the invention. The finger is moved back and forth thereby moving the platen 26. Light from a light source 4 is directed toward the platen surface from a side other than that upon which the finger is placed. A scan line is captured of a portion of the light reflected from the platen 26. The scan line is analysed to determine a presence of fingerprint data on the platen. For example, a number of intensity variations across the platen is summed to determine a presence of a ridge pattern. When fingerprint data is detected, a scan line location from the motion sensor and the scan line data are transmitted to a host computer. When no fingerprint data is received, the imaging device verifies that no image capture is in progress. When image capture is in progress, it is aborted and the host computer is sent a single indicating such. When no image capture operation is in progress, the imaging device captures another scan line and analyses it. In this fashion, the imaging device continues in an endless loop. Preferably, aborting of an image capture operation only occurs after a number of consecutive scan lines each having no fingerprint data. The number is easily determined through use and testing of an imaging device according to the invention and is dependent upon scanning speed, platen size, and the algorithm used to detect fingerprint information.

According to a preferred embodiment as described with reference to FIG. 12, an image detection algorithm is employed to detect desired image information. For example, when capturing a fingerprint image, an image detection algorithred, which eliminates the need of providing temperature detection elements in the number corresponding to the number of the induction heating mechanisms 5011 to 501n and an attempt can be made to reduce the cost thereof.

In this manner, in this embodiment, the image fixing device comprises temperature detection means which is rotatably provided and subsequently detects the surface temperature of the roller 506 corresponding to two or more independent jacket chambers 5101 to 510n, the therefrom. When scan line data from a same location is already present for a current image capture operation, the information is discarded, alternatively, it is stored in a memory location dependent upon the scan line location. In an embodiment, the imaging device tracks scan lines that are already captured and only transmits scan lines within a current image capture process that have not been previously transmitted.

Of course, extra random access memory (RAM) may be employed in any of the embodiments described to improve performance, flexibility and reliability. Optionally, when sufficient RAM is used, image reconstruction is performed within the imaging device and more advanced processing and control is employed.

Numerous other embodiments may be envisaged without departing from the spirit and scope of the invention.

What is claimed is:

1. A biometric imaging device comprising:
   an optical sensor for detecting incident light and for providing a second signal in dependence upon incident light, the optical sensor having an optical sensor rate for capturing a predetermined area;
   a light source for providing light to the optical sensor along an optical path;
   a platen comprising a plurality of prisms, the platen disposed within the optical path for reflecting a portion of light incident thereon along the optical path toward the optical sensor;
   wherein at least one of the optical path and the platen is moveable relative to the other to provide relative movement independent of the optical sensor rate; and,
   a motion sensor for sensing relative motion between the platen and the optical path and for providing a first signal in dependence thereon.

2. A biometric imaging device according to claim 1 comprising a processor for receiving the first signal and the second signal and for providing a third signal based on the first signal and the second signal the third signal comprising image data and a relative location for the image data.

3. A biometric imaging device according to claim 1 comprising a processor for receiving the second signal and for determining a substantial likelihood of a presence of a fingertip on the platen.

4. A biometric imaging device according to claim 1 wherein the optical sensor comprises a linear array of optical sensors for capturing a scan line; wherein the platen comprises a microprism structure; and comprising a processor for determining a location of a captured scan line and for performing one of providing the scan line with further data indicative of the location and storing the scan line at a memory address based on the location.

5. A biometric imaging device comprising:
   i) a moveable platen having a first surface for accepting a biometric information source on one side thereof and a plurality of substantially parallel prisms having a face parallel to the first surface and illumination and viewing faces on a second side of the platen;
   ii) a motion sensor for sensing movement of the movable platen and for providing a first signal in dependence thereon;
   iii) a source of light for directing light through an illumination face of a prism from the plurality of prisms and for illuminating a portion of the first surface; and,
   iv) an image sensor for receiving light reflected from the first surface through a viewing face of a prism from the plurality of prisms and for providing a second signal in dependence upon received light, the image sensor having a sensor rate for capturing a predetermined area and the movable platen being capable of motion at a speed independent of the sensor rate for capturing a predetermined area.

6. A biometric imaging device as defined in claim 5 wherein the first face of the prisms are substantially the platen surface.

7. A biometric device as defined in claim 5 wherein the illumination faces are substantially parallel one to the others and viewing faces are substantially parallel one to the others.

8. A biometric imaging device as defined in claim 5 wherein the platen comprises a microprism structure.

9. A biometric imaging device as defined in claim 5 comprising a processor for receiving the first signal and the second signal and for providing a third signal based on the first and second signals the third signal comprising image data and a relative location for the image data.

10. A biometric imaging device as defined in claim 5 comprising a second optical path and a further image sensor disposed to receive light reflected off the platen along the second optical path.

11. A method of capturing biometric information comprising the steps of:
    a) providing a biometric information source;
    b) capturing a scan line across the biometric information source with an image sensor;
    c) measuring a scan line location using a motion sensor;
    d) storing the captured scan line in memory;
    e) moving the biometric information source relative to the image sensor;
    f) detecting the relative motion and determining a distance therefrom;
    g) capturing another scan line across the biometric information source with the image sensor;
    h) storing in a non-sequential fashion the captured other scan line in memory in dependence upon the detected relative motion; and,
    i) repeating the steps (e), (f), (g), and (h) a plurality of times.

12. A method of capturing biometric information according to claim 11 wherein the steps (e), (f), (g), and (h) are repeated until substantially an entire image of the biometric information source is captured and stored.

13. A method of capturing biometric information according to claim 11 further comprising the step of analysing the scan line to determine a presence of biometric information within the scan line.

14. A method of capturing biometric information according to claim 11 wherein the step of e) moving the biometric information source relative to the image sensor is performed by moving the platen and the biometric information source disposed upon the platen.

15. A method of capturing biometric information according to claim 11 wherein the step of (h) storing the captured other scan line in memory in dependence upon the detected relative motion is performed by storing a scan line at a memory address based on the detected relative motion and an image resolution.

16. A method of capturing biometric information according to claim 11 comprising the step of maintaining information relating to one of locations of scan lines that are captured and stored in a present image and locations of scan lines that are not captured and stored in a present image.

17. A fingerprint imaging device comprising:
    a linear photodetector array for detecting incident light and for providing a second signal in dependence upon incident light;
    a light source for providing light to the linear photodetector array along an optical path;
    a microprism structure disposed with a substantially flat side thereof for receiving a fingertip and with a portion of the other side thereof within the optical path for receiving light from the light source and for reflecting a portion of light incident thereon along the optical path toward the optical photodetector array, the microprism structure moveably mounted to permit movement along a direction substantially parallel to the substantially flat side thereof;

a motion sensor for sensing relative motion between the platen and the optical path and for providing a first signal in dependence thereon; and, a processor for storing image information in a non-sequential fashion based on the first and second signals;

whereby an entire image of a fingerprint is captured by detecting incident light at each of a plurality of different relative locations and by storing information relating to the detected incident light at each different location.

* * * * *

UNITED STATES PATENT AND TRADEMARK OFFICE
CERTIFICATE OF CORRECTION

PATENT NO. : 5,920,384
DATED : July 6, 1999
INVENTOR(S) : Borza

It is certified that error appears in the above-identified patent and that said Letters Patent is hereby corrected as shown below:

At column 1 line 23 please replace "coverting" with --converting--

At column 2 line 3 please replace "incedence" with --incident--

At column 6 line 1 please replace "driven" with --drives--

At column 8 line 27 please replace "single" with --signal--

At column 8 lines 42-51, please replace "algorithred...510n, the therefrom." With --algorithm such as that disclosed in U.S. Patent Application 08/805,869 hereby incorporated by reference is employed. Detection of desired image data permits monitoring of the device at all times without significantly effecting overall system performance.

Figure 13:
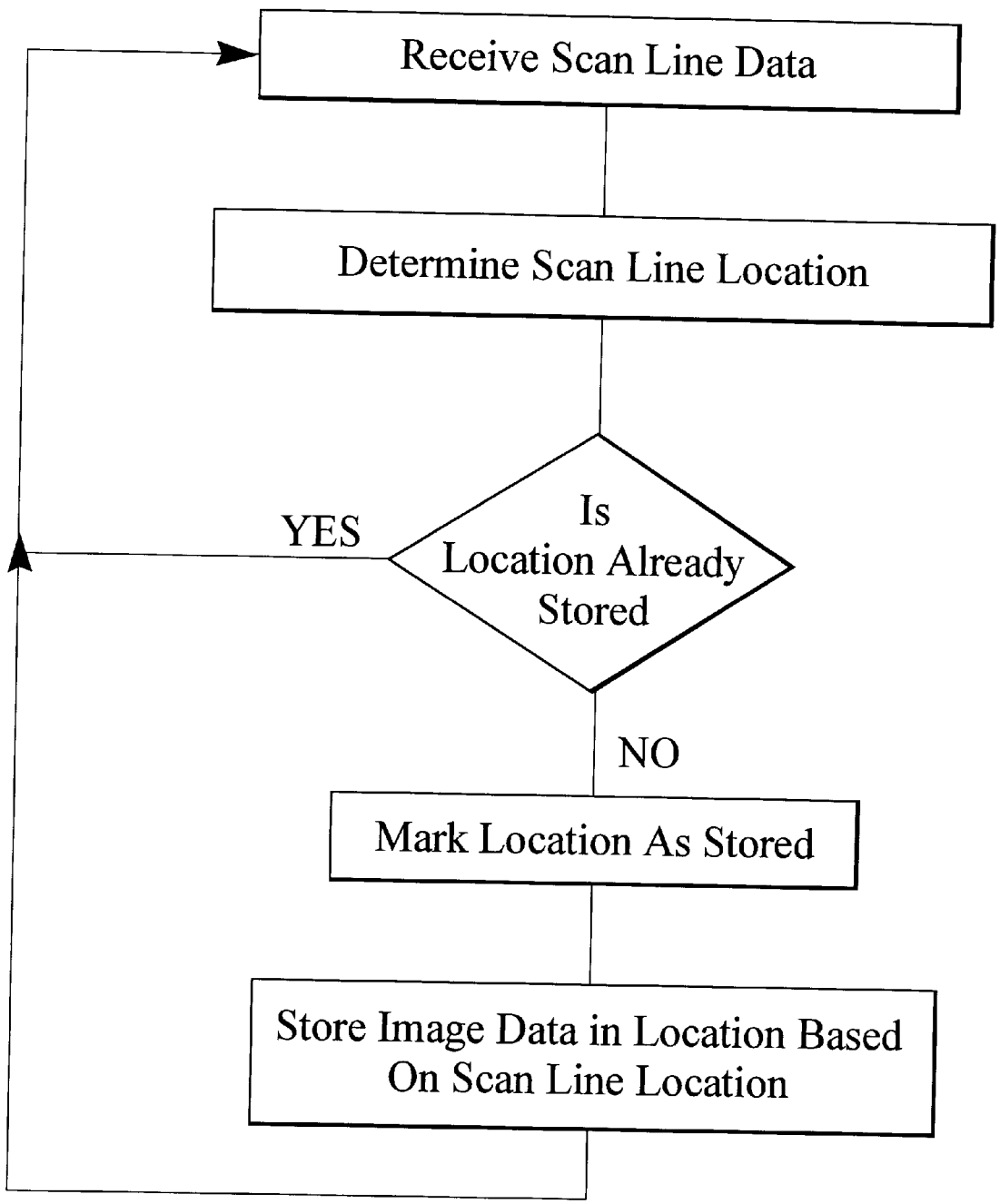

Referring to Fig. 13, a simplified flow diagram of a method of processing image data captured by an imaging device according to the invention to form an image is shown. Scan line data is received and a scan line location is determined therefrom.--

Signed and Sealed this

Fourteenth Day of December, 1999

Attest:

Q. TODD DICKINSON

Attesting Officer

Acting Commissioner of Patents and Trademarks